Aug. 18, 1942.  L. GREENFIELD  2,293,204

CONSTANT VELOCITY UNIVERSAL JOINT

Filed April 3, 1941

Inventor.
Louis Greenfield.

Patented Aug. 18, 1942

2,293,204

UNITED STATES PATENT OFFICE 2,293,204

CONSTANT VELOCITY UNIVERSAL JOINT

Louis Greenfield, Toronto, Ontario, Canada

Application April 3, 1941, Serial No. 386,641

10 Claims. (Cl. 64—21)

The principal objects of this invention are to provide an improved form of universal joint which will transmit motion from a driving to a driven shaft at uniform velocity irrespective of the angular relation of the shaft axes and to provide a form of construction which will present no difficult problems in the manufacture or assembly and in which little relative motion will be required between the component parts in service and extensive surface area will be present to distribute the tortional stresses.

The principal features of the invention reside in the novel construction and arrangement of parts whereby the respective main shaft portions are constrained to swing universally about a common point and are tortionally connected by a floating intermediate shaft unit having guiding and driving engagement with the respective main shaft portions at opposite sides of said common point whereby the axis of the intermediate shaft will at all times be uniformly angularly related to the axis of each of the main shaft portions and a uniform velocity drive is ensured.

A further and important feature resides in the novel construction of the component parts of simple form readily producible at low cost and capable of being readily assembled.

In the drawing Figure 1 is a mid-sectional part elevational view of a preferred form of universal joint constructed in accordance with the present invention.

Figure 2:
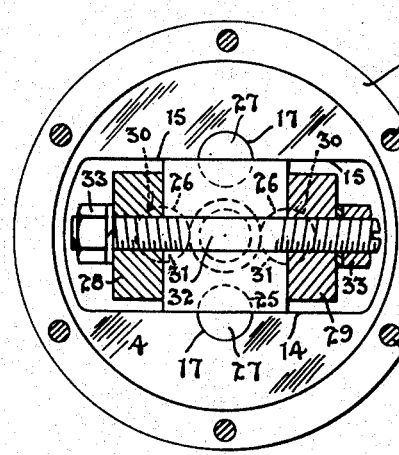
Figure 2 is a transverse section on the line 2—2 of Figure 1.
Figure 1:
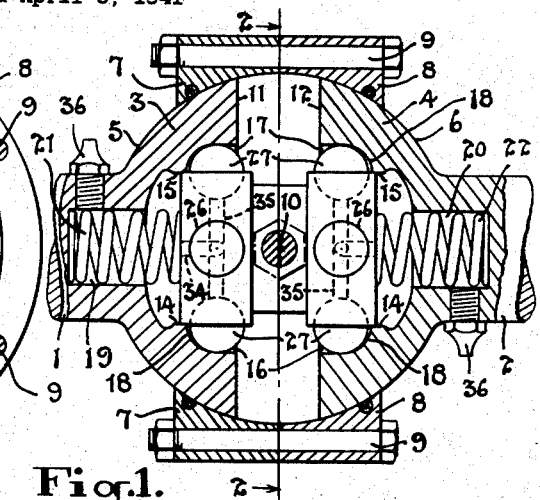

It is well known in the art that the common form of universal joints do not transmit rotary motion at uniform velocity between the driving and the driven shafts and it has been authoritatively shown that with the driving and driven shafts arranged at an angle of 45° the driven shaft will lag behind the driving shaft in varying amounts running higher than 9° for a 90° rotation of the driving shaft, while during the next 90° rotation of the driving shaft the driven shaft will lead the driving shaft in varying amounts ranging higher than 9° at the intermediate point.

Considering this phenomena from the standpoint of relative variation in the rotation speeds of the driving and driven shafts at various shaft angles and on the basis of a constant driving shaft speed of 100 R. P. M., it may be said that the discrepancy increases proportional to the increase in the angular relation of the shafts and ranges from a maximum speed of 100.38 to a minimum speed of 99.62, a difference of 0.6 R. P. M. at a 5° shaft angle, to a maximum speed of 141.42, to a minimum speed of 70.71 (a difference of 70.71 R. P. M.) at a 45° shaft angle.

Various attempts have been made to produce a form of universal joint which will overcome the above disadvantages associated with the usual Cardan or conventional type of joint, and while a number of so-called "constant velocity" joints or couplings have been produced these are inevitably required to be manufactured to extremely fine limits, involving very difficult machining and finishing operations.

It is further found that such joints, while they function with reasonable accuracy while new, they are neveretheless subject to increasing inaccuracies as wear develops, a situation which is aggravated due to the very limited contact areas available between the torque transmitting parts.

The present invention has been devised to eliminate difficulties associated with prior constructions and to provide a form of construction which will present no difficult problems in manufacture and which will retain its features of accuracy indefinitely under even the most severe service conditions.

In accordance with the preferred form of the invention illustrated the driving and driven shaft elements 1 and 2 respectively are formed with enlarged mating portions 3 and 4 presenting spherical outer surfaces 5 and 6 which are embraced by the floating ring unit formed of separable sections 7 and 8 clamped together by bolts 9.

The floating ring unit is interiorly finished to snugly engage the spherical surfaces 5 and 6 so that the shaft portions 3 and 4 may individually oscillate relative to the floating ring member while the latter maintains the surfaces 5 and 6 concentric with the central point 10.

Each of the shaft portions 1 and 2 may be either interiorly or exteriorly splined in order to co-operate with other shaft elements.

The enlarged portions 3 and 4 of the shafts are here shown provided with inner plane surfaces 11 and 12 which are spaced sufficiently far apart to permit the required relative swinging movement of the shafts, and a rectangular recess 13 extends inwardly from each of the plane surfaces 11 and 12 diametrically of the shaft portions 3 and 4 and these are finished to present parallelly spaced smooth bearing surfaces 14 and 15 spaced equi-distant from the respective shaft axes.

Semi-cylindrical bearing recesses 16 and 17 are formed diametrically in the walls of the slots 13 so that their axes are parallel with the respective shaft axes and preferably contained in the plane of the surfaces 14 and 15, and the inner end extremities are preferably of semi-spherical form as indicated at 18.

Cylindrical recesses 19 and 20 lead into the reduced portions of the shafts 1 and 2 from the inner end of the transverse slots or recesses 13 and these accommodate coiled compression springs 21 and 22 which project a definite distance in relation to the central point 10.

Metal blocks 23 and 24 of square or rectangular form have their opposite faces parallel and formed with diametrically opposite semi-spherical sockets 25 and 26, the axes of which are preferably contained in the planes of said surfaces.

Balls 27 are arranged in the sockets 25 and the metal blocks 23 and 24 are snugly fitted within the respective recesses 13 of the shaft portions 3 and 4 with the balls 27 fitting within the semi-cylindrical recesses or sockets 16 and 17 so that each block is non-rotatable about the axis of the respective shaft portion but is capable of slight sliding displacement in an axial direction and of pivotal displacement about the centres of the balls 27.

Metal blocks 28 and 29 of rectangular form are provided on their inner faces with semi-spherical sockets 30 which register with the semi-spherical sockets 26 of the blocks 23 and 24 to accommodate ball members 31 so that the blocks 28 and 29 may pivot as a unit relative to the blocks 23 and 24 about the centre of the balls 31. The blocks 28 and 29 may be clamped firmly together in any desired manner but in Figure 2 I have shown a preferred arrangement in which a clamping bolt or stud 32 is provided with left and right threaded portions respectively engaging the blocks 29 and 28 and clamped by lock nuts 33.

Figure 3:
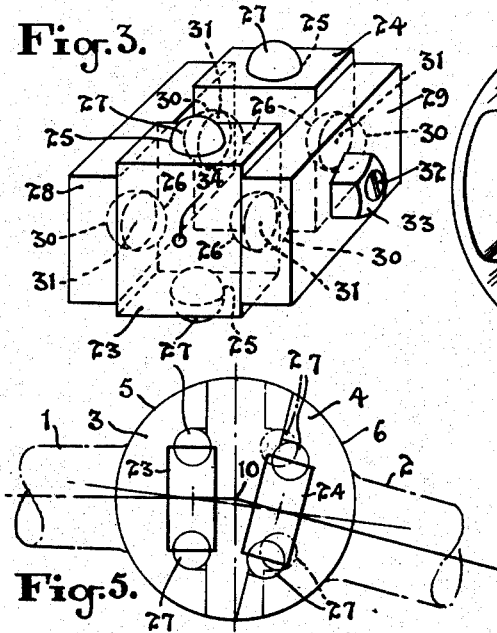
Figure 3 is a perspective view of the intermediate floating shaft unit.
Figure 4:
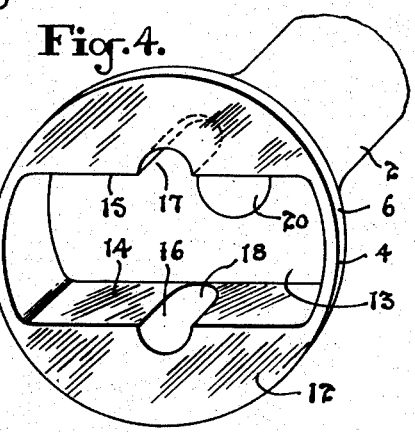
Figure 4 is a perspective view of the end portion of one of the main shaft members.

The unit comprising the blocks 23 and 24 and 28 and 29 in their assembled relation as shown in Figure 3 may be said to comprise an intermediate floating shaft unit, the axis of which extends parallel with the bars 28 and 29 through the centres of the blocks 23 and 24 and this assembly is preferably effected prior to inserting the same between the shaft portions 3 and 4, after which the outer floating ring, formed of the sections 7 and 8, is clamped in place.

It is important to note that the faces of the blocks 23 and 24 adjacent the surfaces 14 and 15 of the recesses 13 not only slidably engage such surfaces but they form a definite drive contact for transmitting torsional thrusts, while the ball elements 27 co-operate with the semi-cylindrical sockets 16 and 17 to definitely guide the respective blocks 23 and 24 so that the centres thereof will always be in alignment with the respective shaft axes.

Moreover the compression springs 21 and 22 co-operate with the respective blocks 23 and 24 to definitely centralize the floating shaft unit irrespective of the relative angular positions of the respective shaft sections.

Figures 5, 6:
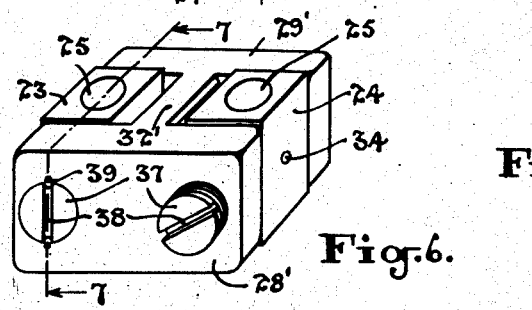
Figure 5 is a somewhat diagrammatic representation of Figure 1 illustrating the relative disposition of the parts with the shafts in angular relation.
Figure 6 is a perspective view of a modified form of intermediate floating shaft unit.

It will be further noted on reference to Figure 5 that, when the one shaft is operating at an angle to the other shaft, the respective parts will automatically be caused to assume a relationship which will maintain the central axis of the floating shaft unit in uniform angular relation to each of the axes of the main shaft sections so that the angle will be equally divided between the shafts, thereby ensuring a uniform velocity drive.

The block members 23 and 24 are here shown provided with lubricant bores 34 from which passages 35 radiate to the respective ball sockets and lubricant fittings 36 connect with the spring recesses 19 and 20 so that lubricant may be forced directly to the ball sockets.

Figure 7:
Figure 7 is a transverse section on the line 7—7 of Figure 6.

In the modification of Figures 6 and 7 the blocks 28' and 29' are formed integrally with a central connecting portion 32' and, instead of forming the semi-spherical sockets in the bar members 28' and 29', these are formed in the inner end of plug members 37 which are threaded into threaded openings in the bar members 28' and 29' to intimately engage the ball members 31' and they are preferably locked in place by displacing a portion of the metal of the members 28' and 29' into a radial slot 38, as represented at 39.

Figure 8:
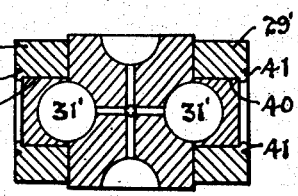
Figure 8 is a transverse section similar to Figure 7 illustrating a modified form of assembly.

As represented in Figure 8 the threading of the plug members may be dispensed with and these may be formed as a press fit as shown at 40, and the surrounding portion of the members 28' and 29' may be swedged inwardly thereover as represented at 41.

It will be appreciated that with a construction such as defined the ball members, which only have a very limited area of contact with the walls of the semi-cylindrical sockets 16 and 17, will be relieved of the full working thrusts, since these will be transmitted directly from the driving member 3 to the block 23 by reason of the surface engagement of these members at 14 and 15, and thence through the balls 30 to the bar members 28 and 29 or 28' and 29' to the block 24 which block will also have a direct drive engagement with the driven shaft 4 by reason of the snug engagement with the surfaces 14 and 15 thereof.

It will also be noted that extensive driving contact will be presented between the blocks 23 and 24 and the blocks 28 and 29 by reason of the substantially continuous contact therewith of the balls 30.

It will therefore be seen that there will be an extensive distribution of the working thrusts over extensive areas so that the joint will operate efficiently and will not be subject to rapid wear or inaccuracies due to the rapid wearing of parts such as experienced in structures at present in use.

While I have shown and described a preferred form of the present invention I may resort to various structural modifications within the essential spirit thereof and while I have indicated balls as the driving or guiding medium, I may, in certain cases replace these by pin elements similarly located.

The device is of simple inexpensive construction but fulfills the essential requirements for a constant velocity universal joint.

What I claim as my invention is:

1. In a universal joint, main shaft members oscillatable about a common centre and an articulated torque-transmitting means having pivotal relation with said shaft members at points spaced from said common centre axially of said main shaft members, and means providing for sliding displacement of the pivotal relation between said torque-transmitting means and at least one of said main shaft members.

2. In a universal joint, main shaft members oscillatable about a common centre and torque-transmitting means having combined pivotal, sliding relation to said respective main shaft members at points spaced from said common centre axially of said respective shafts, including flexibly connected block members having direct sliding and non-rotative driving connection respectively with said main shaft members, and ball elements forming guiding and rolling connections between said block members and the respective shafts.

3. In a universal joint, main shaft members oscillatable about a common centre, means for transmitting a constant velocity drive between said main shaft members including an intermediate floating shaft unit formed of articulated central and end members, the end members being non-rotatably associated with each of said main shaft members in a plane spaced axially from said common centre and also having sliding displacement axially of each main shaft, and resilient means cooperatively engaging each of said end members of the floating shaft unit and exerting balanced axial pressures in opposite directions thereon to maintain the floating shaft unit centralized between said main shaft units.

4. In a universal joint, main shaft units oscillatable about a common centre, a floating shaft unit interposed between said main shaft units and formed of end members and side members pivotally associated, said end members being slidably and non-rotatably recessed into the respective main shaft units, and means for imparting a centralizing guiding influence on said floating shaft unit.

5. A universal joint as claimed in claim 4 in which said last-mentioned means includes ball members spherically seated in said end members and engaging semi-cylindrical recesses in the shaft members the axes of which are parallel with the respective shaft axes.

6. In a universal joint, main shaft members oscillatable about a common centre and each having diametrically disposed end slots each presenting spaced guide surfaces parallel with the respective shaft axis, blocks snugly fitted in said end slots for sliding and pivotal displacement, means forming pivotal and sliding connections between said blocks and respective shaft members, members pivotally connecting said blocks for swinging displacement relative thereto on axes parallel with said guide surfaces, and means for exerting a centralizing action on said pivotally connected block assembly.

7. In a universal joint having main shaft members oscillatable about a common centre, a floating articulated intermediate shaft unit composed of end members pivotally linked together, said end members having transverse pivotal engagement with the respective shaft members in planes perpendicular to the axes of the respective main shaft members, and means for guiding said end members of the floating shaft unit to maintain its axis in uniform angular relation to the respective axes of the main shaft members.

8. In a universal joint having main shaft members oscillatable about a common centre, a floating articulated intermediate shaft unit comprising rectangular blocks formed with semi-spherical sockets diametrically opposed, bars extending between said blocks presenting mating semi-spherical sockets, balls in said sockets, means for securing said bars in place, sockets in said shaft members for receiving said blocks, and diametrically opposed ball sockets receiving the balls of certain of said block sockets.

9. A joint as claimed in claim 8 in which said bars are integrally connected and plug members are inserted and locked therein having the semi-spherical sockets formed therein.

10. A joint as claimed in claim 8 in which said plug members are threaded into the bar members and the metal of the latter is deformed thereover to lock the plug members in place.

LOUIS GREENFIELD.